United States Patent [19]
Morito

[11] Patent Number: 4,974,094
[45] Date of Patent: Nov. 27, 1990

[54] DIRECT LIGHTING/ILLUMINATING SYSTEM FOR MINIATURE CCD CAMERA

[76] Inventor: Yuhkoh Morito, c/o Moritex Corp., Meisei Bldg. 8-9 Sakuragaoka-cho, Shibuya-ku, Tokyo, Japan

[21] Appl. No.: 444,978

[22] Filed: Dec. 4, 1989

[51] Int. Cl.⁵ .................... H04N 2/225; G02B 21/06; G02B 6/06
[52] U.S. Cl. .................... 358/225; 350/523; 350/96.25; 362/32; 358/901; 358/229; 358/209
[58] Field of Search .................... 358/213.11, 901, 93, 358/101, 107, 209, 225, 229; 350/523, 96.25, 96.24; 362/32

[56] References Cited

U.S. PATENT DOCUMENTS

| | | | |
|---|---|---|---|
| 4,473,848 | 9/1984 | Juergensen | 358/901 |
| 4,637,691 | 1/1987 | Uehara et al. | 350/523 |
| 4,677,473 | 6/1987 | Okamoto et al. | 358/106 |
| 4,747,030 | 5/1988 | Offner et al. | 362/32 |

Primary Examiner—James J. Groody
Assistant Examiner—Wendy R. Clements

[57] ABSTRACT

An illuminating system for the miniature CCD camera of a direct contact microscope. Light from a light source is channeled through a fiber optic bundle to two half spheres where the light rays are reflected through an observation hole to an object. The illuminated image of the object is directed through a magnifying lens to the CCD camera for displaying on a monitor.

5 Claims, 1 Drawing Sheet

U.S. Patent    Nov. 27, 1990    4,974,094

DIRECT LIGHTING/ILLUMINATING SYSTEM FOR MINIATURE CCD CAMERA

BACKGROUND OF THE INVENTION

This invention relates generally to a direct lighting-/illuminating system for CCD cameras, and in particular, to direct lighting/illuminating systems for miniature CCD cameras used with direct contact microscope imagery.

In the past a CCD camera was attached to the eye piece of a microscope to make analytical observations of an object. The illuminating method generally used a lamp, a metallic reflector for the microscope and a fiber optic direct angular illuminator or other similar lighting source.

There was no problem in the past using this system since CCD cameras then, were large and bulky. Recently developed CCD cameras are less than 1 cm in diameter which are highly miniaturized and with the attachment of the microscope's objective lens to the CCD camera further miniaturization has become possible. In the mean time a problem has developed concerning the adequacy of illuminating a subject object under a miniaturized CCD camera. It has been found that the traditional light source will not illuminate and disperse light evenly on an object surface when the new CCD camera is used.

The inventor is aware of several U.S. patents of interest, the following list shows the recent state of the art of microscope illuminating systems: U.S. Pat. No. 4,351,584, issued to Chandesais; U.S. Pat. No. 4,464,705, issued to Horowitz: U.S. Pat. No. 4,637,691, issued to Uehara et al: U.S. Pat. No. 4,650,279, issued to Magee: U.S. Pat. No. 4,683,524, issued to Ohta; and U.S. Pat. No. 4,725,727, issued to Harder et al.

Referring to the Chandesais patent, U.S. Pat. No. 4,351,584, ring lighting for microscopes is disclosed. A light source remote from the object being examined illuminates the object via a fiber optic guide extending to an annular endpiece and a reflector. Light passing through the fiber optic guide is reflected off the ring reflector and directed on the object.

U.S. Pat. No. 4,725,727, issued to Harder et al is directed to a waveguide for an optical near-field microscope. Transparent optical bodies are coated with an opaque material and the apex of the optical bodies are removed so to expose the transparent body through a first aperture and to expose the transparent layer through a second aperture. Light enters the transparent body at its remote end and exits through the first aperture to illuminate an object. Reflected light from the object enters the transparent layer through the second aperture and is guided to a light detector for further processing.

The Harder et al patent is a patent the inventor is aware of which addresses an illuminating system which uses fiber optics, FIGS. 6 and 7, to illuminate an object using an optical near-field microscope. Near-field optical microscopes are used to examine objects that are almost invisible to the eye, such as viruses, bacteria and electronic circuits. The present problem is how to improve the resolving power of these microscopes. There are two pending U.S. Patent applications cited in Harder et al on the subject of near-field microscopes with apertures smaller than one wavelength to control resolution. The present invention uses a direct contact microscope which does not require adjustment to achieve good resolution; and the illumination system evenly disperses light for use with a miniature CCD camera which is suitable for color dispersion and other analytical purposes.

BRIEF DESCRIPTION OF THE INVENTION

This invention addresses the problems of past illiminating systems by providing a parabolic sphere composed of lower and upper half spheres having observation holes at the center of the respective spheres with a light source placed at the hemispherical mid-line of the half spheres, from which light is directed via a fiber optic bundle toward the interior reflective surface of the lower half sphere.

Light from a light source is channeled through a fiber optic bundle into the reflective portion of the lower half sphere, which allows even illuminating and dispersing of light on a viewing surface through an observation hole, while eliminating the light having oriented and/or directed high beam characteristics.

DESCRIPTION OF THE INVENTION

Figure 3:
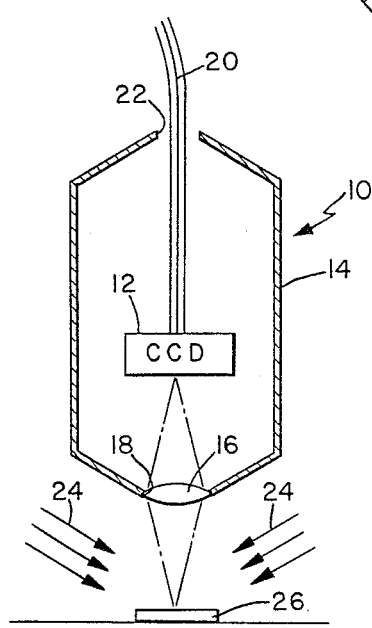
FIG. 3 illustrates a prior art illuminating system.
Figure 4:
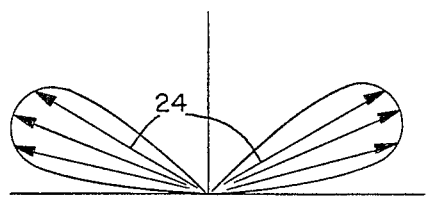
FIG. 4 shows a light dispersion pattern of the illuminating system of FIG. 3.

Referring to the drawings there is shown in FIGS. 3 and 4 a prior art miniature CCD camera and microscope system 10. The CCD camera 12 is mounted in the lower opening 18 of the housing. Connecting camera leads 20 extend through upper opening 22 of the housing and plug into a monitor 1 (not shown) for direct visual observation of an object 26.

Arrows 24 represent light rays for illuminating the object. The adequacy of the illuminating system has been a major problem since the light source does not illuminate and disperse light evenly on the object surface. FIG. 4 shows an uneven illumination dispersion pattern. Part of the problem is the distance of the microscope lens 16 from the object 26, because it allows the light rays 24 to disperse away from the lens.

Figure 1:
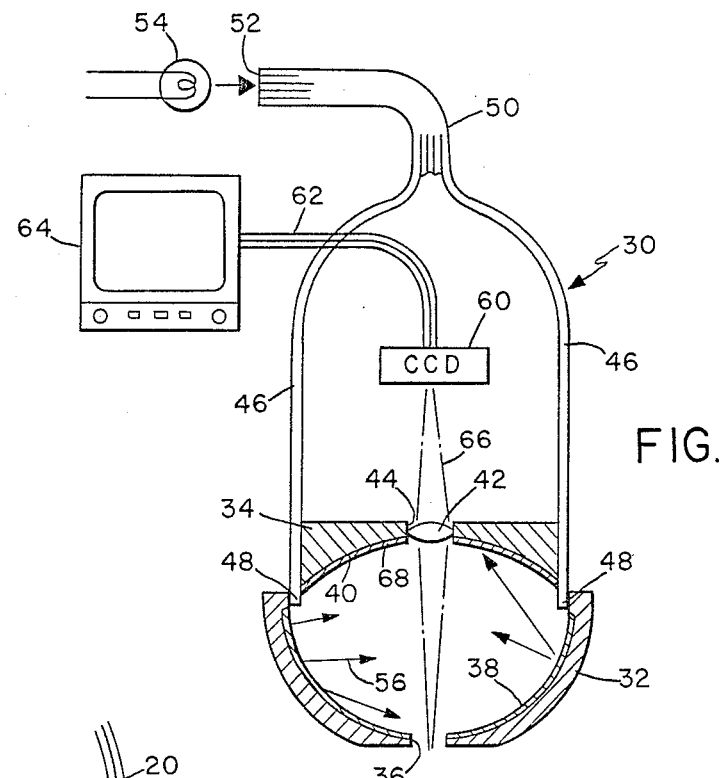
FIG. 1 is a plan view of an illuminating system of the present invention.

FIG. 1 shows the basic elements of an optical direct contact microscope 30. As mentioned, the present invention contemplates two parabolic half spheres 32 and 34, respectively. The lower sphere half 32 has a hole 36 in the center and is coated on its interior with a metallic reflective coating 38. Upper sphere 34 is a cylindrical block with a concave surface 40 coated with a metallic coating 68. The thickness of the block provides a good supporting area for magnifying lens 42. A hole 44 in the center of the half sphere 34 aligns with the hole 36 in the lower half sphere 32. The magnifying lens 42 is centered in the hole 44 and permanently mounted therein.

Surrounding the upper half sphere 32 are a plurality of optical fibers 46. The optical fiber ends 48 extend inside the lower half sphere 32 where the upper and lower half spheres 32 and 34 join. The lower half sphere 32 having a larger circumference fits over the optical fibers 46 and their ends 48.

The single optical fibers 48 extend upwardly and come together to form an optical fiber bundle 50, ending in a bundle end 52. In direct line with the optical fiber bundle end 52 is a light source 54.

Figure 2:
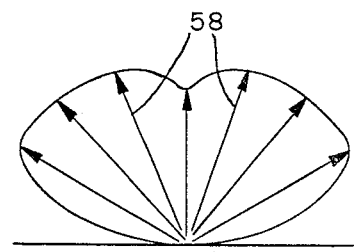
FIG. 2 shows a light dispersion pattern of FIG. 1.

Light from the light source 54 travels through the optical fiber 46 and out their ends 48. The light, represented by arrows 56, bounces off the reflective surface 38 of the lower half sphere 32 to illuminate an object, not shown. The pattern of the light illuminating the object is represented by arrows 58 in FIG. 2. The light rays 58 are directed toward the magnifying lens 42 evenly, without the distortion of the prior illuminating systems, depicted in FIG. 4.

Mounted above the magnifying lens 42 and in a direct line extending from the hole 36 and the lens 42 is a miniature CCD camera 60. The miniature CCD camera 60 has camera leads 62 connected to a viewing monitor 64. An image 66 of the object which has been illuminated is directed through magnifying lens 42 to miniature CCD camera 60 where it is sent to the monitor 64.

The lower half sphere 32 rests on, or is suspended just above the object to prevent uneven dispersion of the light rays.

To summarize the operation of the illuminating system 30, light from the light source 54 is channeled through the optical fibers 50 and individual optical fibers 48 onto the interior reflective surface 38 of lower half sphere 32, then it is reflected upon the interior surface of the upper half sphere 34. Through the process, light is evenly dispersed through the observation hole 36. Thus, non oriented/ directed, evenly dispersed illuminating light is attained through the magnifying lens 42 and the properly placed miniature CCD camera 60 which projects the view of the object to the monitor 64.

The object of the illuminating system of this invention is the sufficient availability of evenly illuminated light made possible so that when color dispersion analysis of an object is performed an increased reliability is achieved.

Further, in order to accommodate the trend of miniaturization of CCD cameras, the use of traditional parabolic spheres is not only costly, it is difficult if not impossible to miniaturize lighting systems because of the inherent restrictions in the light source entering the interior of the sphere. By splitting the sphere into two halves and by channeling the light around the joining edges of the half spheres, the spheres of the invention can be manufactured inexpensively and allows further miniaturization.

While the invention has been described as a single embodiment, it is obvious that one knowledgeable in the art may realize other embodiments. Therefore, it is recommended that the drawing description and claims should be studied for a full understanding of the invention.

I claim:

1. An illuminating means for use in a microscope to illuminate an object to be examined by a miniaturized CCD camera along a viewing axis comprising;
    a first half sphere having a reflected coating on its interior;
    a second half sphere having a reflected coating on its interior;
    a magnifying lens mounted in said second half sphere;
    an observation aperture in said first half sphere aligned with said magnifying lens in said second, half sphere;
    a plurality of optical fibers partially surrounding the perimeter of said second half sphere, said first half sphere fitting over said optical fibers and completing a spherical shape with said second half sphere;
    said optical fibers forming an optical fiber bundle with an end exposed to a light source;
    a light source for illuminating an object, channeling light through said optical fiber bundle and said individual optical fibers to the interior of said first and second half sphere, the light being reflected off of said reflective coating to illuminate an object.

2. An illuminating means as in claim 1 wherein said miniaturized CCD camera is mounted above said magnifying lens and in alignment with said magnifying lens and said observation aperture, where said miniaturized CCD camera is connected to a monitor means.

3. An illuminating means as in claim 2 wherein said microscope is in direct contact with an object.

4. An illuminating means as in claim 3 wherein the illuminating light from said first and second half spheres evenly illuminates an object.

5. An illuminating means as in claim 4 wherein said microscope is portable.

* * * * *

UNITED STATES PATENT AND TRADEMARK OFFICE
CERTIFICATE OF CORRECTION

PATENT NO. : 4,974,094

DATED : November 27, 1990

INVENTOR(S) : Yuhkoh Morito, et al.

It is certified that error appears in the above-identified patent and that said Letters Patent is hereby corrected as shown below:

Title page:
   The names of the inventors should read --Yuhkoh Morito and Katsuyuki Igarashi--

The patent should read assigned to --Moritex Corporation--;

Signed and Sealed this

Thirteenth Day of April, 1993

Attest:

STEPHEN G. KUNIN

Attesting Officer

Acting Commissioner of Patents and Trademarks